Dec. 7, 1965 F. A. LOSEE 3,222,454

DIGITAL COMPARISON CIRCUITS

Original Filed Nov. 18, 1958 4 Sheets-Sheet 1

INVENTOR.
FERRIL A. LOSEE,
BY
Noel B. Hammond
AGENT

Dec. 7, 1965 F. A. LOSEE 3,222,454

DIGITAL COMPARISON CIRCUITS

Original Filed Nov. 18, 1958 4 Sheets-Sheet 2

INVENTOR.
FERRIL A. LOSEE,
BY Noel B. Hammond
AGENT.

DIGITAL COMPARISON CIRCUITS

Original Filed Nov. 18, 1958 4 Sheets-Sheet 3

INVENTOR.
FERRIL A. LOSEE,
BY
Noel B. Hammond
AGENT.

DIGITAL COMPARISON CIRCUITS

Original Filed Nov. 18, 1958

INVENTOR.
FERRIL A. LOSEE,
BY
Noel B. Hammond
AGENT.

3,222,454

DIGITAL COMPARISON CIRCUITS

Ferril A. Losee, Los Angeles, Calif., assignor to Hughes Aircraft Company, Culver City, Calif., a corporation of Delaware Continuation of application Ser. No. 774,782, Nov. 18, 1958. This application June 18, 1962, Ser. No. 203,282
14 Claims. (Cl. 178—88)

The present invention relates to circuits for detecting changes in a signal and, more particularly, to circuits for comparing one signal unit with a successive signal unit.

This application is a continuation of a prior copending application Serial No. 774,782, filed November 18, 1958.

Although there are many uses for the present invention, it may be utilized with significant advantage in a system of radio signaling wherein the phase of a carrier wave is modulated in accordance with digital data. More particularly, information is conveyed by the change or lack of change of phase between successive groups of cycles or modulation intervals of a wave train. The modulation is accomplished by shifting the phase of the carrier to a predetermined one of several discrete phase states in accordance with the information to be transmitted. For example, the phase of a wave may be shifted between a first phase state and the phase state which is 180 degrees out of phase with the first phase state. Thus, a 180-degree change of the phases of the wave during successive modulation intervals may be taken to represent a "space" symbol and no phase change during successive modulation intervals may be taken to represent a "mark" symbol.

In a receiver for demodulating this type of modulated wave, it is necessary to provide a phase-reference signal with which to compare the phase of the wave during each group of cycles or modulation interval. Further, provision must be made for the phase-reference signal to be derived from or synchronized in phase with the phase of the wave during each modulation interval prior to the comparison of the phase-reference signal with the phase of the wave during the next successive modulation interval.

One prior art phase detection system utilizes a phase-locked oscillator as a phase memory to remember the phase of one pulse until the occurrence of a second pulse. Inasmuch as the phase-reference signal must be extremely stable and accurate, the phase-locked oscillator is usually crystal controlled. High-Q ringing circuits are also used as a phase memory. However, a wave developed by a stable, high-Q circuit such as a crystal controlled oscillator or a high-Q ringing circuit, is difficult to reset quickly to a different radio frequency phase. This restricts the use of this type of phase memory to communications systems having a relatively low signaling speed. Further, if a reactance tube is used to control an oscillator, changes in the reactance tube's characteristics may introduce frequency drifts or phase shifts into the phase reference wave developed by the oscillator.

Additionally, in view of the present-day crowded radio spectrum conditions, it is usually necessary to pass the received signal through narrow-band filters, particularly if frequency-division multiplexing is utilized. Narrow-band filters introduce a phase transient which causes an error in the reset of a phase-locked oscillator or a ringing circuit.

Another type of phase memory is a delay line which is particularly useful where ionospheric propagation is utilized or as a common phase memory for all subcarrier waves of a frequency-division multiplex wave. However, a delay line is not always convenient to use where long delays are desirable, or where the received wave is not subject to progressive phase-shift, as in line-of-sight propagation.

Accordingly, it is an object of the present invention to provide apparatus for developing a reference signal which is stable, accurate, quickly resettable and operable over a wide range of time intervals.

Another object of the invention is the provision of apparatus responsive to a train of groups of pulses having a variable time of occurrence for selecting a single pulse from each group.

Another object of the invention is the provision of a simple, inexpensive communications receiver for accurately and reliably demodulating phase-modulated signals at high or low signaling rates in the presence of noise and phase transients.

In accordance with the present invention, a train of reference pulses is synchronized with each received signal unit, which may be a pulse of a pulse train or cycle of a wave train, to preserve the information conveyed by it until the occurrence of the next signal unit. Each signal unit is then compared with one of the reference pulses synchronized by the preceding signal unit. Thus, an output signal is developed which is representative of the relative likeness or unlikeness of successive signal units. The synchronization of the reference pulses by the signal units is delayed lightly so as to permit the comparison to be made prior to the synchronization.

A feature of the invention is the provision of a pulse sampling arrangement for passing an individual pulse from a group of pulses having variable times of occurrence and rejecting the remainder. To initiate the sampling operation, a trigger pulse is applied to a sampling pulse generator which initiates the generation of a sampling pulse. The sampling pulse and the pulses to be sampled are applied to a coincidence gate which passes the first of the sampled pulses which is coincident with the sampling pulse. A signal representative of the passed or sampled pulse is then fed back to the sampling pulse generator for terminating the generation of the sampling pulse, thus causing the gate to open.

For a better understanding of the invention, together with other and further objects thereof, reference may be made to the following description taken in connection with the accompanying drawings in which embodiments of the invention are illustrated by way of example only, like reference characters designating like parts throughout the figures thereof and wherein.

Figure 1:
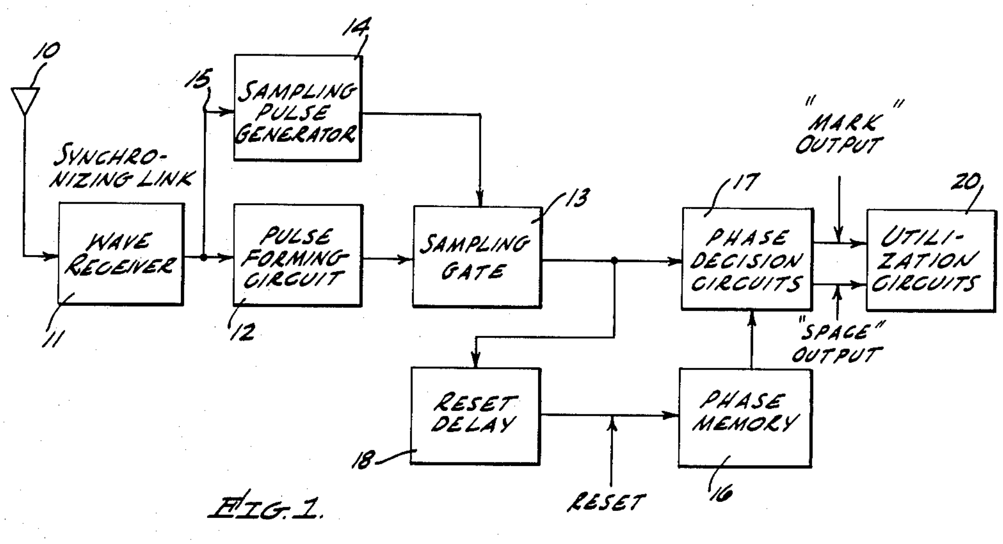
FIG. 1 is a diagram in block form of an embodiment of a digital communications receiver in accordance with the present invention.

Referring now to FIG. 1 of the drawings, there is illustrated a diagram of a receiver for demodulating a wave modulated by discrete shifts in the phase thereof in a predetermined manner. The modulated wave is intercepted by an antenna 10 which is coupled to a wave receiver 11 which amplifies the modulated wave, rejects interference and converts the wave to a suitable frequency. The wave receiver 11 may be, for example, the RF (radio frequency) and IF (intermediate frequency) circuits of a standard communications receiver, such as the type SP–600–JX, manufactured by the Hammarlund Manufacturing Corporation.

The phase information conveyed by the received wave is changed to a digital or pulse form to permit the use of convenient digital circuits in the remainder of the receiver. This is accomplished by means of a pulse-forming circuit 12 which is connected to the wave receiver 11. The pulse-forming circuit 12 is responsive to the received wave for developing a signal pulse or phase-indicating pulse for each cycle thereof, and each signal pulse has a definite relationship to the corresponding cycle of the wave. For example, each signal pulse may occur at the positive zero-axis-crossing of each cycle of the wave. Therefore, when the wave is shifted in phase, its corresponding signal pulses will be shifted in relative time of occurrence or time-position. A suitable form of pulse-forming circuit 12 has been found to be, for example, a squaring amplifier followed by a pulse differentiating circuit and unilateral conduction means for selecting differentiated pulses of only one polarity.

Inasmuch as each modulation interval of the received wave consists of a group of cycles, a group of phase-indicating pulses are produced for each modulation interval. To eliminate this redundancy, one phase-indicating or signal pulse is selected from each group and the remainder arm repected. In order to select one signal pulse for each modulation interval of the wave, a sampling gate 13 is coupled to the pulse-forming circuit 12. The sampling gate 13 may be a diode "and" gate of the type shown and described in "Digital Computer Components and Circuits" by R. K. Richards, at pp. 37–39. It is a coincidence circuit which will pass a signal pulse only when a sampling pulse is applied at a second input terminal.

A sampling pulse generator 14 is provided for developing a train of sampling pulses which are applied to the sampling gate 13. In order to pass at least one signal pulse, the sampling pulses should have a duration substantially equal to the period of the signal pulses. The period of the sampling pulses is made equal to the modulation period of the received wave which may be four milliseconds and is synchronized thereto by means of a synchronizing link indicated as conductor 15 in FIG. 1. In order to provide synchronization to the received wave, the envelope of the modulation intervals of the received wave may be detected by an envelope detector and converted to a synchronizing signal which is applied to the sampling pulse generator 14. Thus, one sampling pulse is developed for each modulation interval of the received wave. The sampling pulses are then applied to the sampling gate 13 to permit the selection of a single signal pulse for each modulation interval of the received wave.

In order to provide a phase-reference signal with which to compare the phase of each selected signal pulse, a phase memory 16 is provided. The phase memory 16 is a source of phase-reference pulses having a repetition frequency which is equal to the repetition frequency of the signal pulses. The time of occurrence of the phase-reference pulses is shifted to be synchronized with reset pulses which are applied to the phase memory 16. The method of developing the reset pulses will be explained hereinafter.

In order to detect the relative phase of successive selected signal pulses, phase decision circuits 17 are coupled to the phase memory 16 and to the sampling gate 13. The phase decision circuits 17 are responsive to the selected signal pulses and to the phase-reference pulses to compare the relative time of occurrence thereof and thus to develop output signals indicative of the relative phase of two successive selected signal pulses. The phase decision circuits may be, for example, a pair of diode "and" gates, one of which is normally biased open and the other normally biased closed. The presence of a phase-reference pulse causes the condition of the gates to be reversed. Thus, if a selected signal pulse is coincident with a phase-reference pulse, it will appear on one output terminal of the phase decision circuits 17. On the other hand, if a selected signal pulse occurs during the interval between phase-reference pulses, it will be passed to the other output terminal of the phase decision circuits 17.

Each selected signal pulse is also coupled to a reset delay 18 which may be a delay line or any other suitable pulse delaying means having a delay of approximately the period of the signal pulses. The delayed signal pulse or reset pulse is then applied to the phase memory 16 after the phase decision has been made by the phase decision circuits 17, to re-synchronize the phase-reference pulses prior to the application of the next selected signal pulse to the phase decision circuits 17. The output signal of the phase decision circuits 17 will appear on one of two output terminals, depending upon whether successive selected signal pulses have the same or opposite relative phases. For example, if two successive selected signal pulses have the same relative phases, the output signal may be interpreted as a "mark," and if the compared pulses have opposite relative phases the output signal may be interpreted as a "space." The "mark" and "space" output signals are coupled to utilization circuits 20 which may be a teletypewriter, for example, or any suitable digital signal utilizing device.

Figure 2:
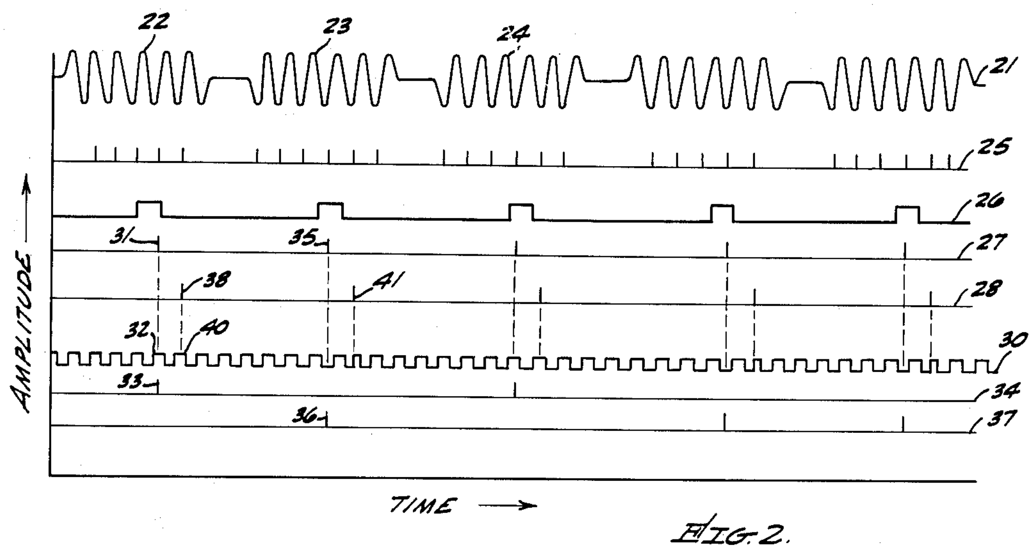
FIG. 2 is a diagram of the waveforms developed by the receiver when in operation.

Referring now to FIG. 2, waveforms of the signals appearing in the receiver of FIG. 1 are illustrated. In FIG. 2, time is depicted as the abscissa and signal amplitude as the ordinate. Waveform 21 is representative of a received wave as it is developed at the output terminal of the wave receiver 11 and each group of cycles represents one modulation interval. The modulation period is the length of time between corresponding parts of consecutive modulation intervals. It will be understood that waveform 21 is merely a representation to more clearly illustrate the operation of the reeciver of the present invention. The received wave may actually have a greater number of cycles per modulation interval and phase and amplitude distortion may be present. Further, there need not necessarily be spaces between groups of cycles but rather the wave may be continuous with abrupt shifts in the phase thereof. On the other hand, the wave may also be pulse modulated with shaped pulses such as sine-squared pulses to provide a smooth transition from one modulation interval to another.

During the first modulation interval, illustrated by the first group of cycles 22, the wave has one absolute phase, while during the second modulation interval, illustrated by the group of cycles 23, the wave has the opposite absolute phase. Thus, it will be seen that there is a phase difference of 180 degrees between the phase of the wave during the first modulation interval 22 and the phase of the wave during the second modulation interval 23. This phase difference may be interpreted as a "space," for example. Similarly, during the third modulation interval 24, the wave has the same relative phase as that during the second modulation interval 23 and may be interpreted as a "mark." Thus, if it is assumed that during the modulation interval which precedes the first illustrated modulation interval 22, the phase of the wave was the same as that during the first modulation interval 22, then the information conveyed by the five modulation intervals illustrated in FIG. 2 may be interpreted as "mark," "space," "mark," "space," "space," which could be, for example, the symbol in the five-unit teletypewriter code for a particular letter of the alphabet.

Waveform 25 depicts the signal or phase-indicating pulses formed by the pulse-forming circuit 12. One signal pulse is formed for each zero-axis-crossing of the received wave of waveform 21. When the phase of the received wave 21 is shifted, the relative time of occurrence of the signal pulses of waveform 25 also is shifted. Thus, the signal pulses of waveform 25 may be considered to be phase-indicating pulses.

The sampling pulses developed by the sampling pulse generator 14 are illustrated by waveform 26. It will be observed that one sampling pulse is provided for each modulation interval of the wave of waveform 21 and that the duration of each sampling pulse is slightly longer than the period of the signal pulses of waveform 25 to insure that at least one of the signal pulses will be coincident with each sampling pulse. The sampling gate 13 is responsive to the signal pulses of waveform 25 and the sampling pulses of waveform 26 to pass a selected signal pulse from the each modulation interval, as illustrated by waveform 27.

The selected signal pulses of waveform 27 are delayed by the reset delay 18 approximately the period of the signal pulses to develop reset pulses illustrated by waveform 28.

The phase reference pulses depicted by waveform 30 are developed by the phase memory 16 and are applied to the phase decision circuits 17 along with the selected signal pulses of waveform 27. Referring now to signal pulse 31 of waveform 27, it will be seen that it is coincident with phase-reference pulse 32 of waveform 30. Thus, a "mark" signal 33 is developed by the phase decision circuit 17 on the "mark" output signal lead, as illustrated by waveform 34. Similarly, signal pulse 35 of waveform 27 is not coincident with a phase-reference pulse of waveform 30 and a "space" signal 36 of waveform 37 is developed at the "space" output terminal of the phase decision circuit 17.

After the phase decision has been made, each reset pulse resets the phase memory 16. Inasmuch as reset pulse 38 of waveform 28 coincides exactly with the center of phase-reference pulse 40 of waveform 30, the resetting does not change the timing of the frequency dividers because each stage is already in the proper state. However, reset pulse 41 does not coincide with the center of a phase-reference pulse and thus causes the phase memory 16 to reset the waveform 30 to change its phase so as to produce successive phase-reference pulses which are synchronized with reset pulse 41. Thus, the particular state of the phase-reference pulses of waveform 30 at the time of comparison with a signal pulse of waveform 27, is indicative of the relative phase of a preceding signal pulse. Therefore, in interpreting the received wave of waveform 21, the phase decision circuits 17 develop the following sequence of output pulses: "mark," "space," "mark," "space," "space."

Figure 3:
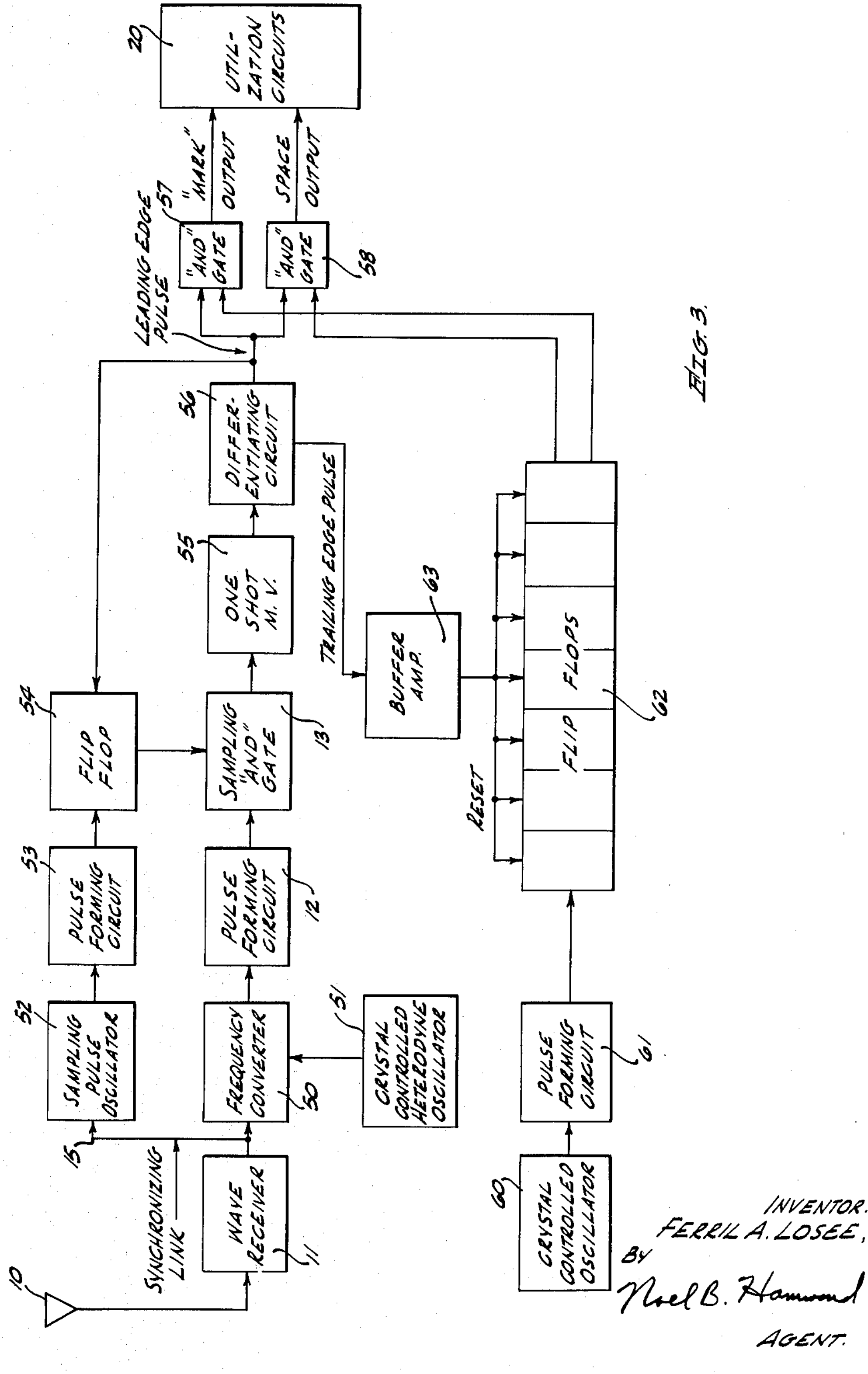
FIG. 3 is a diagram in block form of another embodiment of a receiver in accordance with the present invention.

Referring now to FIG. 3, another embodiment of the digital communications receiver of the present invention is illustrated. The wave receiver 11, which is responsive to a signal intercepted by the antenna 10, is coupled to a frequency converter 50 which mixes the received signal with a heterodyne wave developed by a crystal controlled oscillator 51. Thus, the received wave which is at an intermediate frequency of 455 kilocycles, for example, may be converted to a frequency more suitable for use in conjunction with digital circuits such as, for example, 10 kilocycles. A pulse-forming circuit 12 is coupled to the frequency converter 50 and develops signal pulses illustrated by waveform 25 in the same manner as described above, which pulses are then applied to a sampling "and" gate 13.

A sampling pulse oscillator 52 develops a sampling wave which is synchronized to the modulation period of the received wave by means of a synchronizing link 15. A pulse-forming circuit 53 is responsive to the sampling wave developed by the sampling pulse oscillator 52 to produce a trigger pulse for each modulation period of the received wave. These trigger pulses are then coupled to a bistable multivibrator or flip-flop 54 which initiates the leading edge of a sampling pulse similar to that depicted by waveform 26 of FIG. 2. The sampling pulse is then applied to the "and" gate 13.

Selected signal pulses, illustrated by waveform 27 of FIG. 2 are passed by the "and" gate 13 to a monostable or one-shot multivibrator 55 which develops intermediate pulses having a time duration substantially equal to the period of the signal pulses. The intermediate pulses developed by the one-shot multivibrator 55 are differentiated in a differentiating circuit 56 to develop leading edge or auxiliary pulses and trailing edge delayed reset pulses which correspond generally to the pulses illustrated in waveforms 27 and 28 of FIG. 2, respectively. The leading edge or auxiliary pulse is then coupled back to the flip-flop 54 where it causes the termination of the sampling pulse applied to the sampling gate 13. The auxiliary pulses, which are representative of the selected signal pulses, are applied to a "mark" "and" gate 57 and to a "space" "and" gate 58.

To initiate generation of phase-reference signals, a crystal controlled oscillator 60 produces a primary wave having a frequency of 1280 kilocycles which is applied to a pulse forming circuit 61 which develops primary pulses at this same frequency. The primary pulses are then applied to a seven-stage, resettable, binary counter 62 which develops a train of phase-reference pulses having a repetition frequency of 10 kilocycles. The phase-reference pulses are applied to the "mark" "and" gate 57, and the inverse of the phase-reference pulse train is applied to the "space" "and" gate 58. The trailing edge or delayed reset pulses which correspond to the pulses of waveform 28 are applied to a buffer amplifier 63 which provides power amplification and isolation and which is connected to the reset input terminals of each of the seven stages of the flip-flop counter 62.

Thus, it may be seen that the phase memory flip-flop chain 62 will not reset until after a phase decision has been made. It should be apparent that the individual flip-flop counter stages may or may not be reset according to their state or condition at the time of the occurrence of the reset pulse. For example, the first five stages should be reset to their high or information level, the sixth stage should be reset low and the seventh stage should be reset high. If any of these stages are already in this state, no change will occur. The phase-reference pulses will be reset in increments of the period of the primary wave developed by the crystal controlled oscillator 60. Thus, the phase-reference pulses will have the stability of the crystal controlled oscillator 60 and will have a reset accuracy equal to the period of the primary wave developed by the crystal oscillator 60.

Inasmuch as the phase-reference pulses are applied to the "mark" gate 57 and the inverse of the phase-reference pulse train is applied to the "space" gate 58, the gates 57 and 58 are alternately opened and closed, one gate being open while the other is closed. Thus, a selected signal pulse applied to both of the gates 57 and 58 simultaneously can only pass through one of the gates, depending upon the state of the phase-reference pulse train from the binary counters 62. The digital utilization circuits 20, which may be a teletypewriter or other digital device, are then connected to the "mark" and "space" output gates 57 and 58.

The invention may be embodied in apparatus different from the exemplary embodiment described hereinbefore. For example, in a communication system, it is not necessary for the information to be transmitted as a phase-modulated wave. The position-modulated pulses 27 shown in the waveform diagram of FIG. 2, may be transmitted directly by radio or over a wire line to detection apparatus such as that illustrated in FIG. 4. This apparatus differs from, and has advantage over, other pulse-modulation receivers in that it is not necessary to transmit reference pulses because each signal pulse serves also as a reference pulse for the following signal pulse.

Figure 4:
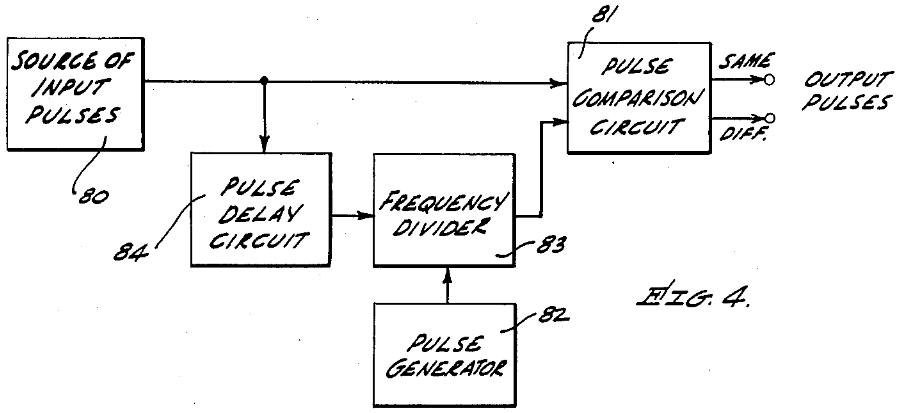
FIG. 4 is a block diagram of a pulse occurrence detection circuit embodying the invention.

Referring now to FIG. 4, a source of input pulses 80, which may be a radio receiver or wire line, is connected to a first input of a pulse comparison circuit 81. The pulse comparison circuit 81 compares each signal pulse with a reference pulse to detect whether the relative time of occurrence is the same or different from that of the preceding signal pulse. The pulse comparison circuit 81 of FIG. 4 may be identical to the phase detection circuit 17 of FIG. 1 or the "and" gates 57, 58 of FIG. 3.

A pulse generator 82 (FIG. 4) and frequency divider 83 produce a train of resettable reference pulses and correspond to the phase memory 16 of FIG. 1 and oscillator 60, pulse forming circuit 61 and flip-flops 62 of FIG. 3. The output of the frequency divider 83 is connected to a second input of the pulse comparison circuit 81. The source of input pulses 80 is connected to a reset input of the frequency divider 83 through a pulse delay circuit 84. The pulse delay circuit 84 may be a section of delay line or a monostable or one-shot multivibrator and is provided to ensure that the reference pulses are reset by each signal pulse after the comparison has been made.

Figure 5:
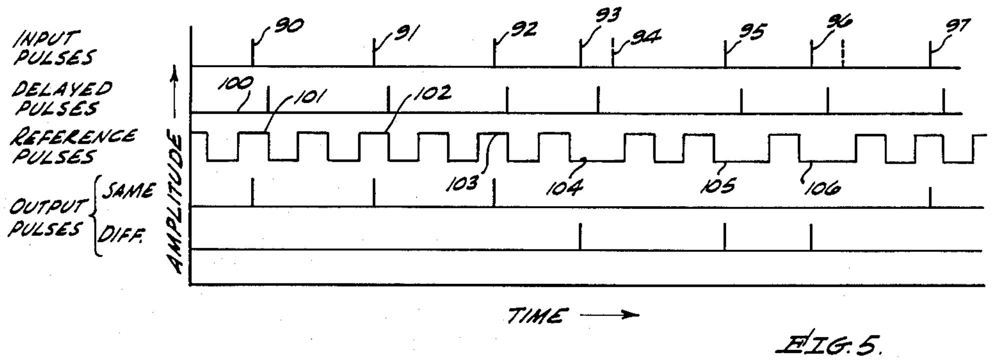
FIG. 5 is a diagram of waveforms developed by the circuit of FIG. 4 when in operation.

Referring now to the waveform diagram of FIG. 5, the input pulses are position-modulated and pulses 90, 91 and 92 occur at the same relative times, while pulse 93, instead of occurring at the same relative time indicated by the dotted line 94, occurs earlier. Pulse 95, instead of occurring at the same early time of occurrence as pulse 93, occurs later. Pulse 96 occurs early and pulse 97 occurs at the same relative time as pulse 96. Thus, the binary information transmitted by the input pulses is, from left to right, like, like, like, unlike, unlike, unlike, and like or mark, mark, mark, space, space, space, mark or 1, 1, 1, 0, 0, 0, 1.

The delayed pulses, indicated by waveform 100 correspond to the input pulses and are each delayed by the same predetermined amount. The reference pulses from the frequency divider 83 cause the signal pulses to be gated to one or the other of two outputs of the pulse comparison circuit 81. When signal pulse 90 occurs, the reference pulse 101 is high and the pulse 90 is passed to the output denoting sameness with the preceding pulse (not shown). When the delayed pulse corresponding to signal pulse 90 occurs, the frequency divider 83 is normally resetting to the low condition and no change occurs in the reference pulses. Similarly, signal pulses 91 and 92 are passed to the "same" output by reference pulses 102 and 103 and no change occurs in the reference pulses. Signal pulse 93, however, occurs when the reference pulse 104 is down and is therefore passed to the "different" output. The delayed pulse corresponding to signal pulse 93 occurs when the reference pulses would normally be changing to the high condition and resets it back to the low condition. Similarly, signal pulses 95 and 96 are passed to the "different" output by reference pulses 105 and 106 and the corresponding delayed pulses reset the reference pulses to the low condition. Thus, it may be seen that the binary information that was transmitted is recovered.

There are other uses for the circuit of FIG. 4, than in a communication system. For example, the circuit may be used in a laboratory to test the stability of a pulse generator. As long as the pulses from the source of input pulses 80 occur at regular intervals, signals are present at the "same" output terminals. Should the input pulses occur at different intervals, there is a signal at the "different" output terminal.

Figure 6:
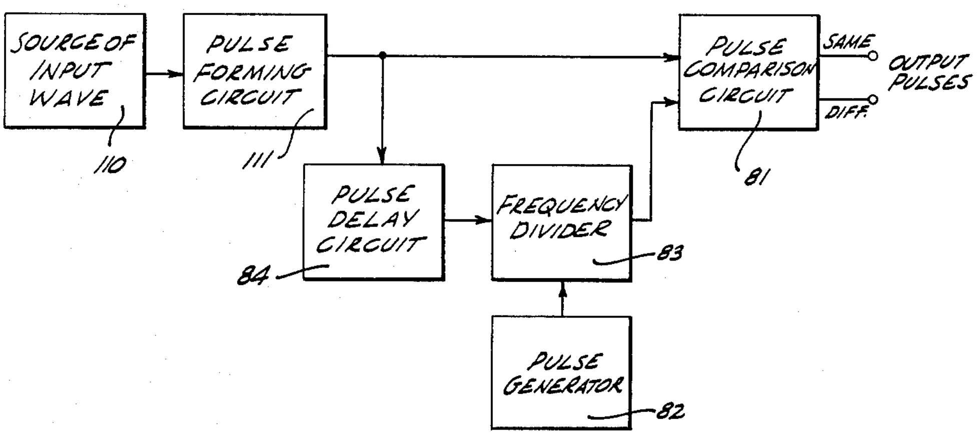
FIG. 6 is a block diagram of a phase modulation detection circuit in accordance with the invention for detecting differences in phase between successive cycles of a periodic wave.
Figure 7:
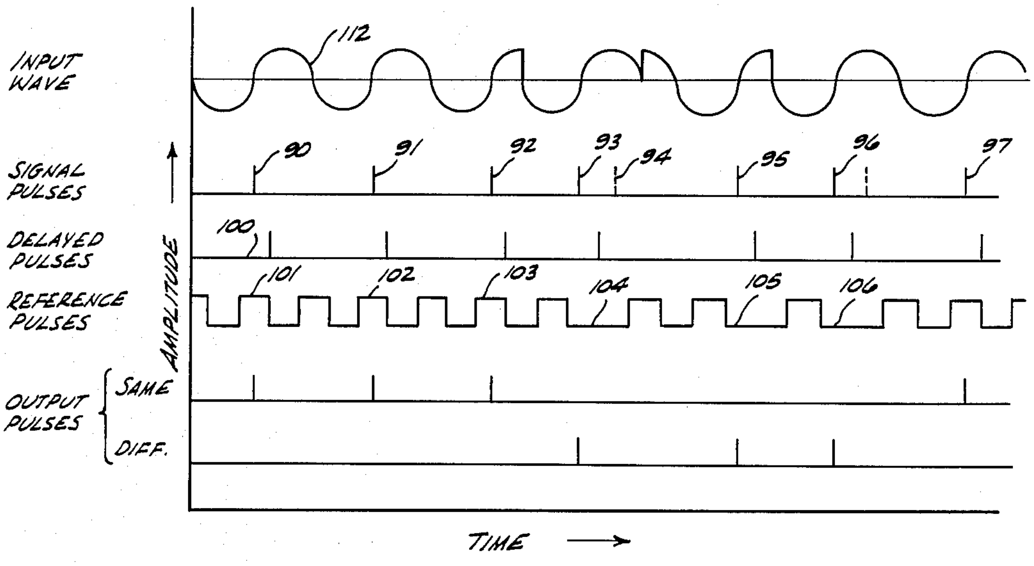
FIG. 7 is a diagram of waveforms developed by the circuit of FIG. 6 when in operation.

In a communications receiver of the type illustrated in FIGS. 1 and 3, it is not necessary for a large number of wave cycles to be present in each modulation interval as illustrated by waveform 21 of FIG. 2. The phase of a single cycle may be compared with the phase of the next successive cycle of a wave. As a practical matter, it is usually more expedient to have several cycles in a modulation interval as at 22 in FIG. 2, but FIG. 6 illustrates a phase-demodulation circuit embodying the invention which operates by comparing adjacent cycles in a periodic wavetrain. A source of an input wave 110, which may be a radio receiver or wire line circuit, applies a phase-modulated wave having a one-cycle modulation interval to a pulse-forming circuit 111. The phase-modulated wave is indicated at 112 in FIG. 7. The pulse-forming circuit 111 may be identical to the pulse-forming circuit 12 of FIGS. 1 and 3 and produces a signal pulse each time the wave 112 crosses the zero axis in a positive-going direction. The source of an input wave 110 and pulse-forming circuit 111 together constitute a pulse source corresponding to the source of input pulses 80 of FIG. 4. Accordingly, the remainder of the single cycle phase demodulator of FIG. 6 is identical to the remainder of the pulse-position demodulator of FIG. 4 and comprises a pulse comparison circuit 81, pulse generator 82, frequency divider 83 and pulse delay circuit 84. The operation of the circuits of FIGS. 4 and 6 are practically identical as is indicated by the fact that the remaining waveforms of FIG. 7 are identical to the waveforms of FIG. 5.

Figure 8:
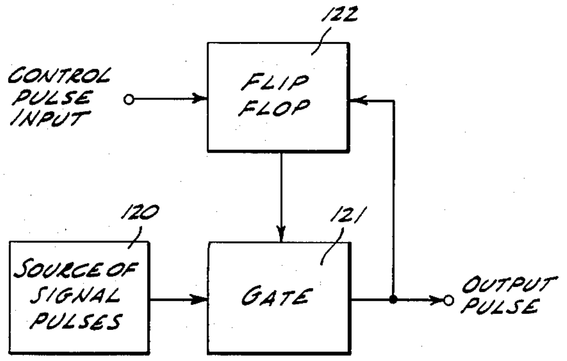
FIG. 8 is a block diagram of a pulse sampling circuit similar to those utilized in the receivers of FIGS. 1 and 3 embodying the present invention.

The pulse sampling arrangement utilized in the receiver circuits of FIGS. 1 and 3 may, if desired, be used for selecting a single pulse from a train of pulses in other systems and for other purposes. For example, a single pulse may be selected from a train for display on a cathode ray oscilloscope. As shown in FIG. 8, a source of signal pulses 120 applies a train of pulses to a gate 121 which corresponds to the gate 13 of FIGS. 1 and 3. When it is desired to select a single one of the signal pulses, a control pulse is applied to a flip-flop 122 to initiate the generation of a gating pulse which is applied to the gate 121. This permits the next occurring signal pulse to be transmitted through the gate 121 to the output, and to simultaneosuly reset the flip-flop 122 to terminate the gating pulse, thus preventing any further signal pulses from passing through the gate 121.

Thus, there has been described simple and inexpensive digital circuitry which may be used for accurately and reliably comparing one signal unit with a successive signal unit. The invention may be applied to the demodulation of a phase-modulated periodic wave or a position modulated pulse train, or may be used in general laboratory equipment when it is necessary to compare one signal unit with a successive signal unit.

While several embodiments of the invention have been shown and described, other modifications may be made and it is intended that the foregoing disclosure shall be considered only as illustrative of the principles of the invention and not construed in a limiting sense.

What is claimed is:

1. A receiver for demodulating a wave modulated by discrete shifts in the phase thereof in a predetermined manner, said wave having a modulation period, particular digital information being denoted by particular relationships between the phases of said wave during successive modulation intervals, said receiver comprising: wave-responsive means for developing phase-indicating pulses whose relative time positions are indicative of the relative phase of corresponding cycles of said wave, sampling means coupled to said wave-responsive means and synchronized with said modulation period for selecting an individual one of said phase-indicating pulses during each modulation interval of said wave, digital phase memory means coupled to said sampling means for developing a periodic train of gate pulses having the same repetition frequency as that of said phase-indicating pulses and whose phase is successively synchronized by each selected one of said phase-indicating pulses, and pulse-comparison means coupled to said sampling means and to said phase memory means for comparing the time of occurrence of each of said selected phase-indicating pulses with a different one of said gate pulses synchronized by an earlier one of said selected phase-indicating pulses to provide an output signal indicative of the relative phase of said wave during successive modulation intervals.

2. A receiver for demodulating a wave modulated by discrete shifts in the phase thereof in a predetermined manner, particular digital information to be transmitted being denoted by particular relationships between the phases of said wave during successive modulation intervals, said receiver comprising: means responsive to said wave for developing signal pulses which are shifted in relative time of occurrence in accordance with shifts in the phase of said wave and for developing delayed signal pulses that occur a predetermined time after the occurrence of said signal pulses, a source of phase-reference pulses, and pulse-comparison means coupled to said wave-responsive means and to said source of phase-reference pulses for comparing the time of occurrence of each of said signal pulses with a different one of said phase-reference pulses to provide an output signal indicative of the relative phase of said wave during successive modulation intervals, said source of phase-reference pulses being coupled to said wave-responsive means for successive synchronization of said phase-reference pulses by said delayed signal pulses after said comparison has been made.

3. In combination, a source of stable recurrent primary pulses, a chain of resettable pulse counters having an input end coupled to said primary pulse source and responsive to said primary pulses for shifting between stable states in a progressive manner along said chain of counters to develop at the output end of said chain a train of stable phase-reference pulses having a repetition frequency which is a fraction of that of said primary pulses, a source of periodic trigger pulses, a sampling pulse generator coupled to said source of trigger pulses for initiating the generation of sampling pulses in response to said trigger pulses, a source of signal pulses having predetermined variations in relative time of occurrence, sampling means coupled to said sampling pulse generator by a first path and coupled to said source of signal pulses and responsive to said sampling pulses for developing selected pulses and delayed reset pulses having predetermined variations in relative time of occurrence, said sampling pulse generator being capable of terminating the generation of said sampling pulses in response to said selected pulses applied thereto from said sampling means by a second path, said counters being coupled to said sampling means and being reset by said reset pulses into predetermined stable states to shift the relative time of occurrence of subsequent ones of said phase-reference pulses in increments of the period of said primary pulses, and coincidence gating means coupled to said sampling means and responsive to said selected pulses and coupled to the output end of said chain of counters for developing output pulses indicative of coincidence between said selected pulses and predetermined ones of said phase-reference pulses.

4. In combination, a first pulse-forming circuit responsive to a phase-modulated wave having periodic modulation intervals for developing a phase-indicating pulse for each cycle of said phase-modulated wave, a sampling gate coupled to said pulse-forming circuit, means responsive to said phase-modulated wave for developing sampling pulses synchronized with the modulation intervals of said phase-modulated wave and coupled to said sampling gate for opening said gate to select an individual one of said phase-indicating pulses for each modulation interval of said wave, means coupled to said sampling gate for developing an auxiliary pulse and a delayed reset pulse in response to each of said selected phase-indicating pulses, said means for developing an auxiliary pulse and a delayed reset pulse being coupled to said sampling pulse-developing means for applying said auxiliarly pulse thereto for terminating the development of each of said sampling pulses after the passage of each of said selected phase-indicating pulses through said sampling gate, an oscillator for developing a primary wave having a frequency which is an integral multiple of the frequency of said phase-modulated wave, a second pulse-forming circuit coupled to said oscillator and responsive to said primary wave for developing a train of primary pulses having a period equal to the period of said primary wave, a frequency divider coupled to said second pulse-forming circuit and responsive to said train of primary pulses for developing alternately occurring trains of phase-reference pulses having opposite polarity and a period equal to the period of said phase-modulated wave, said frequency divider being coupled to said means for developing an auxiliary pulse and a delayed reset pulse and responsive to said delayed reset pulses for periodic synchronization of said phase-reference pulses thereby, and coincidence-gating means coupled to said frequency divider and responsive to said trains of phase-reference pulses and coupled to said means for developing an auxiliary pulse and a delayed reset pulse and responsive to said auxiliary pulses for developing an output signal indicative of the relative phases of said phase-modulated wave during successive modulation intervals.

5. A digital communications receiver comprising a frequency converter responsive to a phase-modulated wave having a modulation period for developing a phase-modulated wave having a frequency within the audio range, a first pulse-forming circuit coupled to said converter for developing signal pulses corresponding to the cycles of said wave having relative shifts in the time of their occurrence indicative of the relative phase of the cycles of said phase-modulated wave, a first oscillator for developing a sampling wave whose period is equal to and in synchronism with said modulation period, a second pulse-forming circuit coupled to said first oscillator for developing trigger pulses whose period is equal to said modulation period, a bistable multivibrator coupled to said second pulse-forming circuit and responsive to said trigger pulses to initiate the generation of sampling pulses, a sampling gate coupled to said first pulse-forming circuit and to said bistable multivibrator and responsive to said sampling pulses and to said signal pulses for developing selected signal pulses having a period equal to said modulation period, a monostable multivibrator coupled to said sampling gate and responsive to said selected signal pulses for developing intermediate pulses having a time duration substantially equal to the audio frequency period of said phase-modulated wave, a differentiating circuit coupled to said monostable multivibrator and responsive to said intermediate pulses for developing auxiliary pulses coincident with said selected signal pulses and for developing reset pulses coincident with the trailing edges of said intermediate pulses, said bistable multivibrator being coupled to said differentiating circuit and responsive to said auxiliary pulses to terminate said sampling pulses prior to the occurrence of a consecutive one of said signal pulses, a second oscillator for developing a primary wave having a frequency which is an integral multiple of the frequency of said audio frequency wave, a third pulse-forming circuit coupled to said second oscillator and responsive to said primary wave for developing primary pulses having a period equal to the period of said primary wave, a synchronizable frequency divider coupled to said third pulse-forming circuit and responsive to said primary pulses for developing first and second trains of alternately occurring phase-reference pulses having a period equal to the audio frequency period of said phase-modulated wave, said frequency divider being coupled to said differentiating circuit and responsive to said reset pulses for periodic synchronization of said phase-reference pulses thereby, a first output gate coupled to said frequency divider and responsive to said first train of phase-reference pulses, a second output gate coupled to said frequency divided and responsive to said second train of phase-reference pulses, said output gates being alternately opened by said phase-reference pulses, said differentiating circuit being coupled to said output gates, whereby said auxiliary pulses pass through the open one of said output gates, and a utilization circuit coupled to said output gates.

6. Pulse-sampling apparatus comprising: a sampling pulse generator, a first control signal means for initiating a sample pulse in said pulse generator, a second control means for terminating said sampling pulse in said pulse generator, a source of signal pulses, a sampling gate means coupled to said sampling pulse generator and to said source of signal pulses for transmitting one of said signal pulses coincident with one of said sampling pulses, and control means coupled to said sampling gate and to said sampling pulse generator and responsive to a transmitted one of said signal pulses for applying said second control signal to said sampling pulse generator for terminating the generation of said sampling pulse.

7. A digital phase modulation detection circuit comprising: first means responsive to a wave modulated by discrete shifts in the phase thereof during successive periodic modulation intervals for developing pulses whose relative time positions are indicative of the relative phase of corresponding cycles of said wave, second means coupled to said first means and synchronized with the modulation period of said wave for selecting during each modulation interval of said wave an individual one of the pulses from said first means, third means coupled to said second means for developing a periodic train of gate pulses having the same repetition frequency as that of the pulses from said first means and whose time of occurrence is successively synchronized by each selected one of the pulses from said first means, and fourth means coupled to said second and third means for comparing the time of occurrence of each selected one of the pulses from said first means with a different one of said gate pulses synchronized by an earlier selected one of the pulses from said first means to provide an output signal indicative of the relative phase of said wave during successive modulation intervals.

8. A phase detection circuit comprising: first means responsive to a wave modulated by discrete shifts in the phase thereof during successive periodic modulation intervals for developing a train of pulses each initiated at corresponding instants of successive cycles of said wave, second means coupled to said first means for selecting during each modulation interval of said wave an individual one of the pulses from said first means, third means for developing a periodic train of gate pulses having the same repetition frequency as that of the train of pulses from said first means and coupled to said second means for successive synchronization of said train of gate pulses by each selected one of the pulses from said first means, and fourth means coupled to said second and third means for comparing the time of occurrence of each selected one of the pulses from said first means with a different one of said gate pulses synchronized by an earlier selected one of the pulses from said first means to provide an output signal indicative of the relative phase of said wave during successive modulation intervals.

9. A phase detection circuit comprising: first means responsive to a wave modulated by discrete shifts in the phase thereof during successive periodic modulation intervals for developing during each modulation interval of said wave an individual pulse whose relative time of occurrence is representative of the relative phase of said wave during the corresponding modulation interval, second means for developing a periodic train of gate pulses having a repetition frequency equal to the frequency of said wave and coupled to said first means for successive synchronization of said train of gate pulses by each of said individual pulses, and third means coupled to said first and second means for comparing the time of occurrence of each of said individual pulses with a different one of said gate pulses synchronized by an earlier one of said individual pulses to provide an output signal indicative of the relative phase of said wave during successive modulation intervals.

10. A phase detection circuit comprising: first means responsive to a wave modulated by discrete shifts in the phase thereof during successive modulation intervals for developing signal pulses which are shifted in relative time of occurrence in accordance with shifts in the phase of said wave and for developing delayed signal pulses that occur a predetermined time after the occurrence of said signal pulses, a source of phase-reference pulses, and pulse-comparison means coupled to said first means and to said source for comparing the time of occurrence of each of said signal pulses with a different one of said phase-reference pulses to provide an output signal indicative of the relative phase of said wave during successive modulation intervals, said source being coupled to said first means for successive synchronization of said phase-reference pulses by said delayed signal pulses.

11. Apparatus for detecting displacements in time of occurrence of individual pulses in a train of input pulses comprising:

(a) a stable pulse generator means for developing a train of primary pulses having a constant repetition frequency higher than the average repetition frequency of said input pulses;
(b) a resettable frequency divider means connected to said pulse generator means for dividing said train of primary pulses to develop a train of reference pulses having a repetition frequency substantially identical to the average repetition frequency of said input pulses;
(c) pulse delay means applying said input pulses to a reset input of said frequency divider means for displacing said reference pulses in accordance with displacements of said input pulses, said pulse delay means providing a time delay less than the normal interval between said input pulses;
(d) and a gate circuit means connected to said frequency divider means and responsive to said input pulses for gating said input pulses to one of two terminals in accordance with whether said input pulses are coincident with said reference pulses.

12. Pulse comparison apparatus comprising:

(a) a source of a train of input pulses having an average predetermined repetition frequency, said input pulses being of short duration compared to intervals between said input pulses, some of said input pulses being displaced in time of occurrence with respect to the preceding one of said input pulses, the amount of displacement being less than the normal interval between said input pulses;
(b) a stable pulse generator means for developing a train of primary pulses having a constant repetition frequency higher than the average repetition frequency of said input pulses;
(c) a resettable frequency divider means connected to said pulse generator means for dividing said train of primary pulses to develop a train of reference pulses having a repetition frequency substantially identical to the average repetition frequency of said input pulses, said reference pulses being of longer duration than said input pulses;
(d) a pulse delay circuit means connecting said source to a reset input of said frequency divider means for displacing said reference pulses in accordance with displacements of said input pulses, said pulse delay circuit means providing a time delay less than the normal interval between said input pulses;
(e) and a gate circuit means connected to said frequency divider means and to said source for gating said input pulses to one of two terminals in accordance with whether said input pulses are coincident with said reference pulses.

13. Apparatus for detecting discrete shifts in phase of individual cycles in a wave train comprising:

(a) a pulse-forming circuit means responsive to said wave train for developing a train of signal pulses, each of said signal pulses corresponding to one of said cycles, said signal pulses having an average repetition frequency substantially identical to the average frequency of said wave train, said signal pulses being of short duration compared to intervals between said signal pulses, a discrete shift in phase of one of said cycles with respect to the preceding cycle being translated into a displacement in time of occurrence of the corresponding one of said signal pulses with respect to the preceding one of said signal pulses;

(b) a stable pulse generator means for developing a train of primary pulses having a constant repetition frequency higher than the average repetition frequency of said signal pulses;

(c) a resettable frequency divider means connected to said pulse generator means for dividing said train of primary pulses to develop a train of reference pulses having a repetition frequency substantially identical to the average repetition frequency of said signal pulses, said reference pulses being of longer duration than said signal pulses;

(d) pulse delay means connecting said pulse-forming circuit means to a reset input of said frequency divider means for displacing said reference pulses in accordance with the displacement of said signal pulses, said pulse delay means providing a time delay less than the normal interval between said signal pulses;

(e) and a gate circuit means connected to said frequency divider means and to said pulse-forming circuit means for gating said signal pulses to one of two terminals in accordance with whether said signal pulses are coincident with said reference pulses.

14. Phase detection apparatus comprising:

(a) a source of a wave train having cycles occurring at a predetermined average frequency, some of the cycles of said wave being discretely shifted in phase with respect to the preceding cycle of said wave, the amount of phase shift being less than 360 degrees;

(b) a pulse-forming circuit means coupled to said source for developing a train of signal pulses, each of said signal pulses corresponding to one of said cycles, said signal pulses having an average repetition frequency substantially identical to the predetermined average frequency of said wave train, said signal pulses being of short duration compared to intervals between said signal pulses, a discrete shift in phase of one of said cycles with respect to the preceding cycle being translated into a displacement in time of occurrence of the corresponding one of said signal pulses with respect to the preceding one of said signal pulses;

(c) a stable pulse generator means for developing a train of primary pulses having a constant repetition frequency higher than the average repetition frequency of said signal pulses;

(d) a resettable frequency divider means connected to said pulse generator means for dividing said train of primary pulses to develop a train of reference pulses having a repetition frequency substantially identical to the average repetition frequency of said signal pulses, said reference pulses being of longer duration than said signal pulses;

(e) a pulse delay circuit means connecting said pulse-forming circuit means to a reset input of said frequency divider means for displacing said reference pulses in accordance with the displacement of said signal pulses, said pulse delay circuit means providing a time delay less than the normal interval between said signal pulses;

(f) and a gate circuit means connected to said frequency divider means and to said pulse-forming circuit means for gating said signal pulses to one of two terminals in accordance with whether said signal pulses are coincident with said reference pulses.

References Cited by the Examiner

UNITED STATES PATENTS

| | | | |
|---|---|---|---|
| 2,589,270 | 3/1952 | Mayle | 328—109 |
| 2,683,802 | 7/1954 | Williams | 328—108 |
| 2,752,593 | 6/1956 | Downs | 328—136 |
| 2,814,725 | 11/1957 | Jacobs et al. | 328—109 |
| 2,948,856 | 8/1960 | Tanaka et al. | 328—110 |

DAVID G. REDINBAUGH, *Primary Examiner.*

UNITED STATES PATENT OFFICE

CERTIFICATE OF CORRECTION

Patent No. 3,222,454 December 7, 1965

Ferril A. Losee

It is hereby certified that error appears in the above numbered patent requiring correction and that the said Letters Patent should read as corrected below.

Column 3, line 34, for "arm repected" read -- are rejected --.

Signed and sealed this 26th day of July 1966.

(SEAL)
Attest:

ERNEST W. SWIDER
Attesting Officer

EDWARD J. BRENNER
Commissioner of Patents